United States Patent [19]

Kähkipuro

[11] Patent Number: 4,791,346
[45] Date of Patent: Dec. 13, 1988

[54] ELEVATOR MOTOR CONTROL

[75] Inventor: Matti Kähkipuro, Hyvinkää, Finland

[73] Assignee: Kone Elevator GmbH, Baar, Switzerland

[21] Appl. No.: 26,029

[22] Filed: Mar. 16, 1987

[30] Foreign Application Priority Data

Mar. 19, 1986 [FI] Finland ............................. 861145

[51] Int. Cl.⁴ ............................................. H02P 5/40
[52] U.S. Cl. ...................................... 318/805; 318/808
[58] Field of Search ................ 318/800, 803, 807–811, 318/805; 324/158 MG

[56] References Cited

U.S. PATENT DOCUMENTS 3,851,234  11/1974  Hoffman et al. .................... 318/800
3,909,687   9/1975  Abbondanti ........................ 318/805
3,989,991  11/1976  Brennen et al. .................... 318/805

OTHER PUBLICATIONS

Leonhard, W., *Control of Electrical Drives*, Springer-Verlag 1985, pp. 205–214.
Murphy, J. M. D., *Thyristor Control of A.C. Motors*, Pergamon Press, 1973, pp. 111–115.

*Primary Examiner*—David Smith, Jr.
*Attorney, Agent, or Firm*—Sughrue, Mion, Zinn, Macpeak and Seas

[57] ABSTRACT

A method of forming the amplitude of the reference voltage of a three-phase inverter supplying a squirrel cage motor requires no current measuring elements. In this method, the amplitude is formed by finding in predetermined constant flux curves which represent the squirrel cage motor in question, and in which the motor rotor current frequency appears as parameter, a curve from which is obtained the amplitude of the motor stator voltage, i.e. of the inverter reference voltage, corresponding to the frequency of the motor's stator voltage, i.e. of the inverter reference voltage, so that the magnetic flux in the stator will be constant.

3 Claims, 2 Drawing Sheets

ELEVATOR MOTOR CONTROL

FIELD OF THE INVENTION

The present invention relates to a method of and apparatus for establishing the amplitude of the reference voltage for a three-phase inverter supplying a squirrel cage motor.

BACKGROUND OF THE INVENTION

The frequency-controlled a.c. motor is the most advanced design for controlled speed drives, e.g. in elevators. With frequency control the efficiency is constantly high at any motor speed, and the mains power factor is nearly unity. Frequency control is applicable in gearless elevators and in elevators with gear transmission, and with any speed. Moreover, it is possible to use for the motor a simple and reasonably priced squirrel cage motor. In elevator applications, a transistor inverter implemented with transistors is best suited for use in frequency control because transistors enable the highest switching frequency to be achieved, among presently existing power electronics components. GTO thyristors may also be contemplated, but their use is somewhat more cumbersome than that of transistors. This is due to the components required for the switching protection circuits which have to be used with GTO thyristors.

Experience has revealed that a good strategy for controlling a squirrel cage motor is to keep the magnetic flux constant. As a rule, inertia is associated with magnetic flux. If the magnetic flux changes, a time constant is introduced in the system. Stabilizing of the magnetic flux may be implemented by maintaining the magnetic flux in the stator or in the rotor or in the air gap constant. Most advantageous is the procedure in which the magnetic flux of the stator is kept constant because the risk of saturation of the components in the motor's magnetic circuit is then at its lowest.

It is present practice, in forming the reference voltage for an inverter, to use current feedback in which the current drawn from the inverter output is measured. The drawback of current feedback is slow response. This slow response is caused by the fact that in current feedback the inductances of the motor give rise to time constants. The control loop, as a rule, becomes slower as the number of time constants in it increases. Moreover, current measuring elements are expensive because they must also be able to measure direct current.

BRIEF SUMMARY OF THE INVENTION

It is an object of the present invention to eliminate or at least mitigate the drawbacks mentioned above.

According to the present invention there is provided a method for forming the amplitude of the reference voltage of a three-phase inverter supplying a squirrel cage motor, comprising the steps of forming the amplitude by finding, in predetermined constant flux curves which represent the squirrel cage motor in question and in which the rotor current frequency of the motor appears as parameter, a curve from which is obtained the amplitude of the motor stator voltage, i.e. of the inverter reference voltage, corresponding to the frequency of the motor stator voltage, i.e. of the inverter reference voltage, so that the magnetic flux in the stator will be constant.

When the method according to the present invention is utilized, no expensive current measuring elements are needed in the process of forming the reference voltage.

A preferred embodiment of the method according to the invention includes approximating the constant flux curves, which are substantially U-shaped by forming the legs of the curve, corresponding to both directions of rotation of the motor, to be linear with the exception of low stator voltage frequencies, and approximating the non-linear portion at the low frequencies with a horizontal line portion, the height of which is found by combining the minimum value of the base curve and a factor proportional to the rotor current frequency.

The present invention also provides apparatus for forming the amplitude of the reference voltage, with the exception of low stator voltage frequencies, of a three phase inverter supplying a squirrel cage motor, comprising first summing means for combining with the stator voltage frequency a correction component proportional to a rotor current frequency, absolute value amplifier means for forming the absolute value of the amplitude in the case of negative frequencies, first adjustment means for adjusting the correction component proportional to the rotor current frequency, second summing means for approximating the non-linear portion at the low frequencies by forming a horizontal portion approximating the minimum of the curve, for the low positive stator voltage frequencies, third summing means for adding to the amplitude value obtained from the second summing means the minimum value of the base curve in the case of the low negative stator voltage frequencies, second adjustment means for adjusting the correction component proportional to the rotor current frequency, third adjustment means for adjusting the minimum value of the base curve, and diodes and diode threshold error correction means for forming the amplitude in various parts of the curve.

BRIEF DESCRIPTION OF THE DRAWINGS

Further objects, features and advantages of the present invention will be apparent from the following description thereof with reference to the attached drawings, wherein.

DESCRIPTION OF THE PREFERRED EMBODIMENT

Figure 1:
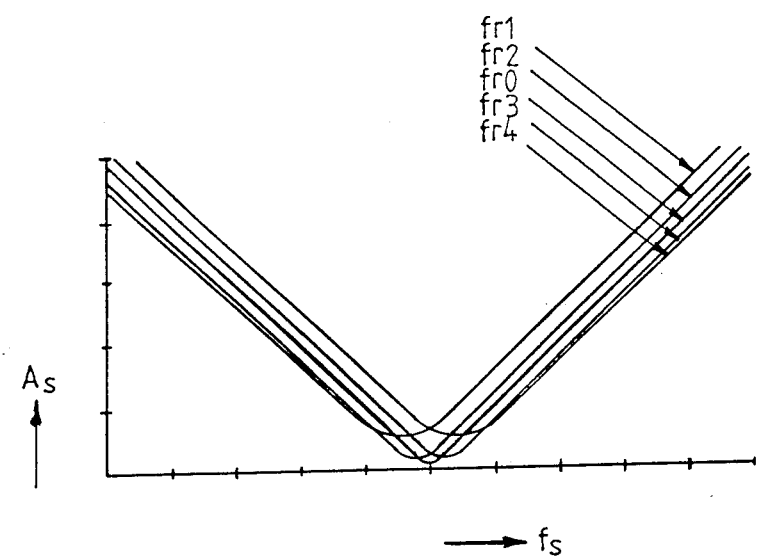
FIG. 1 shows constant flux curves representing a squirrel cage motor.

A method according to the present invention for forming the amplitude As of the reference voltage of an inverter is explained by firstly considering the constant flux curves, representing a squirrel cage motor, of FIG. 1.

The curves of FIG. 1 represent the amplitude As of the motor's stator voltage, i.e., of the inverter reference voltage, as a function of frequency fs, for various rotor current frequencies fr0–fr4 when the magnetic flux of the stator is constant.

As used herein, $f_s$ is an analog voltage proportional to the frequency of the three-phase electricity supplied to the stator of a squirrel cage motor. If $f_s$ is negative, the phasing of the three-phase electricity is reversed. Similarly, $f_r$ is an analog voltage proportional to the frequency of the rotor current. Thus, when the rotor is turning at a synchronous rpm $f_r=0$, and when the rotor is braked quickly, $f_r$ will approximate its maximum value substantially equal to $f_s$.

With the value $fr=0$ of the rotor current frequency we obtain the base curve fr0, its minimum being the minimum value of the reference voltage amplitude. The substantially U-shaped curves are composed of linear portions constituted by high positive and negative stator voltage frequencies fs and of linear portions constituted by low positive and negative stator voltage frequencies fs.

Figure 2:
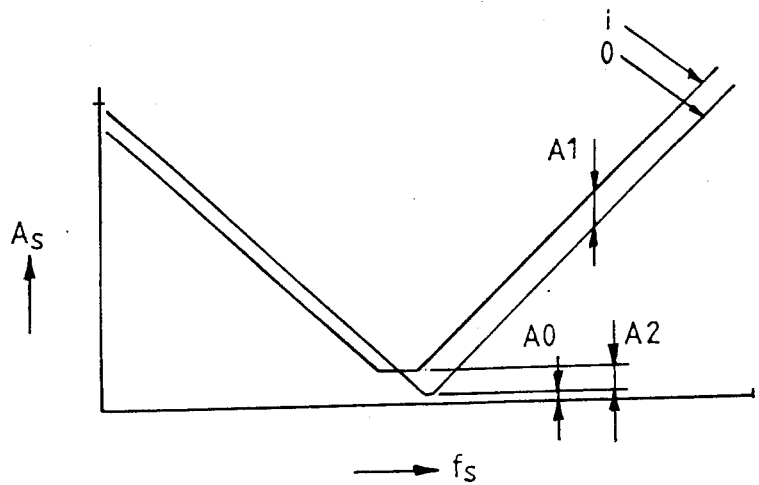
FIG. 2 illustrates the linear approximation of the constant flux curves of FIG. 1.

The curve calculator according to the present invention calculates the amplitude As of the inverter reference voltage, using the linear approximation of the constant flux curve family depicted in FIG. 2. The linear approximation is accurate enough for representing the constant flux curves e.g. in elevator operation. Moreover, setting up, or commissioning, the curve calculator implemented with linear approximation is simpler than that of an analog calculator which calculates the curves exactly.

The curve 0 in FIG. 2 is an approximation of the base curve fr0 of FIG. 1. The minimum of the curve 0 is A0. This voltage A0 occurs when the rotor current frequency fr is zero. If the horizontal axis is interpreted to imply that negative stator voltage frequencies fs refer to the other direction of rotation, the absolute value of the straight line has to be taken in order that the voltage might be correct with negative frequencies fs as well. If to the curve 0 is added a correction component A1 proportional to the rotor current frequency fr and the absolute value is taken, an approximation is obtained for the curves of FIG. 1, with the exception of low stator voltage frequencies fs.

At low stator voltage frequencies fs, the height of the bottom of the curve is proportional to the rotor current frequency fr augmented by the minimum A0 of the base curve. The whole approximative curve i can be formed by combining the curve of stator voltage frequencies fs having a high absolute value with the curve of stator voltage frequencies fs having a small absolute value.

Figure 3:
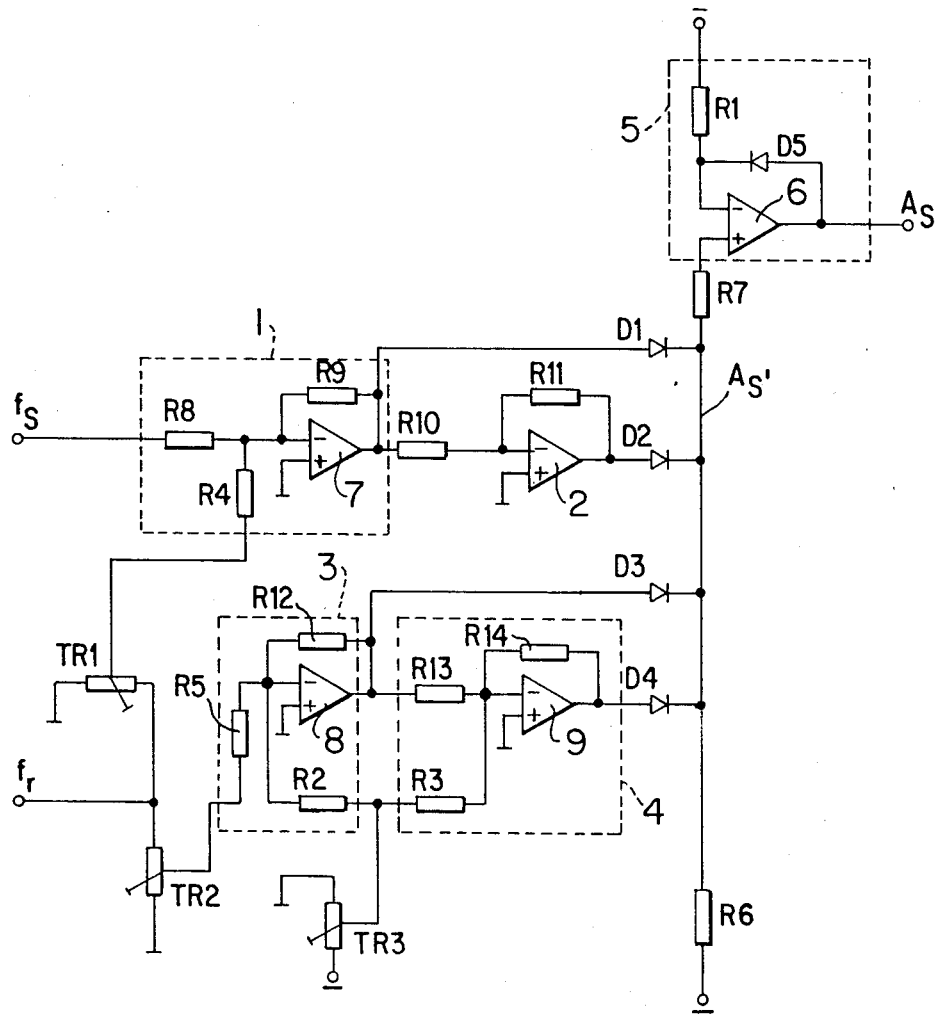
FIG. 3 presents a curve calculator according to the present invention.

In FIG. 3 is presented a curve calculator implementing the linear approximation of the constant flux curves as shown in FIG. 2. The forming of the stator voltage frequency fs and the rotor current frequency fr, which constitute the inputs of the calculator, is a technique with which a person skilled in the art is familiar and is not part of the subject matter of this invention. The operation of the curve calculator of FIG. 3 is now considered.

In the case of stator voltage frequencies fs having a high absolute value, the reference voltage amplitude As is found by combining the stator voltage frequency fs with the correction component A1 found from the rotor current frequency fr and which can be adjusted with trimmer TR1, in the summing unit 1. Summing unit 1 comprises an operational amplifier 7 which, with resistors R8 and R9, forms a first inverting and summing amplifier. The reference voltage amplitude As' thus obtained is applied, in the case of positive stator voltage frequencies fs, to diode D1 and to diode threshold error correction circuit 5, from the output of which the amplitude As is obtained. The input signal $f_r$ determines the lateral transition between the inclined portions of curves i and o in FIG. 2, and the lateral transition range is adjusted by means of trimmer TR1 connected to amplifier 7 through series resistor R4.

The amplitude As is then applied e.g. to a reference oscillator, where the reference voltage of the inverter can be formed. The reference voltage can be applied to control, for instance, a pulse width modulator. The diode threshold correction circuit 5 consists of an amplifier 6, a diode D5 and a resistor R1. The function of the diode threshold circuit 5 is to make a diode threshold error level correction of about 0.5 volts between voltages $A_s$ and $A_s'$ so that voltage level $A_s$ will exceed voltage $A_s'$ by approximately one diode threshold level. Since the correction between the voltage levels $A_s$ and $A_s'$ is required only to compensate for the threshold errors of diodes D1 to D4, it will be appreciated that circuit 5 could be eliminated if diodes D1 to D4 were without such inherent errors. as well as the operation of the diode threshold error correction circuit 5, is obvious to those skilled in the art. With negative stator voltage frequencies fs, the reference voltage amplitude is first carried to an absolute value amplifier 2, which, in combination with resistors R10 and R11, form a second inverting and summing amplifier and from thence a positive amplitude from the negative amplitude is obtained, and then over the diode D2 to the diode threshold error correction circuit 5. Diodes D1 and D2 in combination with amplifier 2 form an absolute value circuit.

At low stator voltage frequencies fs, the amplitude As of the reference voltage is formed by applying a correction component, formed from the rotor current frequency fr, to summing unit 3, where the correction component is combined with the minimum A0 of the base curve. In the case of positive values of the rotor current frequency fr, the amplitude As' is obtained from the summing unit 3, this amplitude consisting of the sum of the correction component A2 and the minimum value A0 of the base curve, as shown in FIG. 2. Summing unit 3 comprises an operational amplifier 8 which, in combination with resistors R5 and R12, forms a third inverting and summing amplifier. The increase of the curve's lowermost value from the minimum level A0 to the A2 level on the horizontal part of the curve is proportional to the signal $f_r$, and the range of adjustment is varied by means of trimmer TR2. The reference voltage amplitude As' is passed through the diode D3 to the diode threshold error correction circuit 5. In the case of negative values of the rotor current frequency fr, the correction component is once again combined with the minimum A0 of the base curve in a summing unit 4, the amplitude As' obtained therefrom being conducted to the correction circuit 5 through diode D4. Summing unit 4 comprises an operational amplifier 9 which, with resistors R13 and R14, forms a fourth inverting amplifier. Diodes D3 and D4 in combination with amplifier 2 form an absolute value circuit similar to that described above with reference to diodes D1 and D2. The correction component A2 that is formed from the rotor current frequency fr can be adjusted with the trimmer TR2. The minimum A0 of the base curve can be adjusted with the trimmer TR3 connected to operational amplifiers 8 and 9 through series resistors R2 and R3, respectively. Whether diode D3 or D4 conducts depends as aforesaid on the polarity of input signal $f_r$. When diode D3 conducts, then minimum amplitude level A0 is adjusted using trimmer TR3 through series resistor R2, and when diode D4 conducts, then obviously the trimmer adjustment is made via resistor R3. Resistor R6 in combination with diodes D1 and D4 forms a positive voltage selection circuit.

It will be apparent to those skilled in the art that various embodiments of the invention are not exclusively confined to the example presented in the foregoing, instead of which they may vary within the scope of the following claims.

I claim:

1. Apparatus for determining the amplitude of the reference voltage, with the exception of low stator voltages frequencies, of a three phase inverter supplying a squirrel cage motor, comprising:

first summing means for combining with said stator voltage frequency a correction component proportional to a rotor current frequency;

absolute value amplifier means for forming the absolute value of the amplitude in the case of negative stator voltage frequencies;

first adjustment means for adjusting the correction component proportional to the rotor current frequency;

second summing means for approximating the nonlinear portion at said low frequencies by forming a horizontal portion approximating the minimum of the curve, for said low positive stator voltage frequencies;

third summing means for adding to the amplitude value obtained from said second summing means the minimum value of the base curve in the case of said low negative stator voltage frequencies;

second adjustment means for adjusting the correction component proportional to the rotor current frequency;

third adjustment means for adjusting the minimum value of the base curve;

and diodes and diode threshold error correction means for forming the amplitude in various parts of the curve.

2. A method for determining the amplitude of the reference voltage for a three-phase inverter for a squirrel cage motor comprising the steps of:

generating an approximation of a constant stator flux curve for said squirrel cage motor as a function of stator voltage frequency and rotor current frequency;

deriving from said approximated curve the amplitude of the stator voltage of said motor for a predetermined stator voltage frequency which voltage corresponds to the amplitude of said reference voltage.

3. The method of claim 2 wherein said approximated constant stator flux curve is substantially U-shaped, with opposed upright legs and a horizontal portion connecting the lower ends thereof, said upright legs corresponding to opposite directions of rotation of said squirrel cage motor and being substantially linear, with the exception of that portion of the curve representing low stator voltage frequencies, which are represented by said horizontal portion, the height of which is determined by combining the minimum value of a base curve and a factor proportional to said rotor current frequency.

* * * * *